(12) United States Patent
Lu et al.

(10) Patent No.: US 11,102,651 B2
(45) Date of Patent: Aug. 24, 2021

(54) METHOD FOR DATA TRANSMISSION, BATTERY MANAGEMENT SYSTEM, AND STORAGE MEDIUM

(71) Applicant: Contemporary Amperex Technology Co., Limited, Ningde (CN)

(72) Inventors: Wenbin Lu, Ningde (CN); Zhimin Dan, Ningde (CN); Yizhen Hou, Ningde (CN); Wei Zhang, Ningde (CN); Jia Xu, Ningde (CN); Jiechao Luo, Ningde (CN); Teng Yu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 140 days.

(21) Appl. No.: 16/555,020

(22) Filed: Aug. 29, 2019

(65) Prior Publication Data

US 2020/0084624 A1     Mar. 12, 2020

(30) Foreign Application Priority Data

Sep. 12, 2018    (CN) .......................... 201811062076.1

(51) Int. Cl.
    *H04L 9/08*         (2006.01)
    *H04W 12/06*      (2021.01)
    (Continued)

(52) U.S. Cl.
    CPC ........... *H04W 12/06* (2013.01); *H04L 9/0825* (2013.01); *H04L 9/0866* (2013.01);
    (Continued)

(58) Field of Classification Search
    CPC ... H04W 12/06; H04W 12/04; H04W 12/041; H04W 12/0471; H04W 12/069;
    (Continued)

(56) References Cited

U.S. PATENT DOCUMENTS

| 6,748,082 B1 * | 6/2004 | Vieweg | H04L 9/083 380/273 |
| 2005/0271207 A1 * | 12/2005 | Frey | H04L 9/0668 380/263 |

(Continued)

FOREIGN PATENT DOCUMENTS

| CN | 106357690 A | 1/2017 |
| CN | 106571907 A | 4/2017 |

(Continued)

OTHER PUBLICATIONS

The extended European search report dated Nov. 8, 2019 for European Application No. 19195297.7, 10 pages.

(Continued)

*Primary Examiner* — Kristine L Kincaid
*Assistant Examiner* — Shaqueal D Wade
(74) *Attorney, Agent, or Firm* — Law Offices of Liaoteng Wang (57) ABSTRACT

The embodiments of the present disclosure disclose a method for data transmission, comprising: authenticating, by a target node in a battery management system, a source node in response to a request for data transmission from the source node; selecting, by the target node, any two prime numbers from a pre-stored set of prime numbers if the authentication is passed, generating a public key and a private key according to the two prime numbers, and transmitting the public key to the source node; performing, by the source node, a first encryption byte-by-byte for source data to be transmitted using the public key, performing a second encryption for the first encrypted data using a first encryption algorithm stored by the source node itself, and transmitting the second encrypted data to the target node.

18 Claims, 4 Drawing Sheets

(51) Int. Cl.
  *H04L 9/30* (2006.01)
  *H04L 9/14* (2006.01)
  *H04L 29/06* (2006.01)
  *H04W 12/033* (2021.01)
  *H04W 12/041* (2021.01)
  *H04W 12/71* (2021.01)
  *H04W 12/0471* (2021.01)
  *H04L 9/32* (2006.01)

(52) U.S. Cl.
  CPC .............. *H04L 9/0869* (2013.01); *H04L 9/14* (2013.01); *H04L 9/3033* (2013.01); *H04L 9/3242* (2013.01); *H04L 63/045* (2013.01); *H04L 63/0478* (2013.01); *H04W 12/033* (2021.01); *H04W 12/041* (2021.01); *H04W 12/0471* (2021.01); *H04W 12/71* (2021.01); *H04L 63/061* (2013.01); *H04L 63/08* (2013.01)

(58) Field of Classification Search
  CPC ... H04L 63/04; H04L 63/045; H04L 63/0478; H04L 63/06; H04L 63/061; H04L 63/08; H04L 63/0428; H04L 63/0442; H04L 9/30; H04L 9/33; H04L 9/08; H04L 9/0869; H04L 9/14; H04L 9/0825; H04L 9/0866; H04L 9/302; H04L 9/3242; H04L 9/0656; H04L 9/06; H04L 9/0662; H04L 9/0838
  See application file for complete search history.

(56) References Cited

U.S. PATENT DOCUMENTS

| | | | | |
|---|---|---|---|---|
| 2013/0227286 A1* | 8/2013 | Brisson | ................ | H04L 9/3226 713/168 |
| 2016/0295404 A1* | 10/2016 | Gouget | ............... | H04L 63/0869 |
| 2016/0380770 A1* | 12/2016 | Whitmer | ............... | H04L 9/0643 713/181 |
| 2017/0208049 A1* | 7/2017 | Hu | ........ | H04L 63/061 |
| 2017/0237566 A1 | 8/2017 | Sullivan | | |
| 2018/0219674 A1 | 8/2018 | Mullins | | |
| 2019/0372973 A1* | 12/2019 | Gaonkar | ............. | H04L 63/0876 |
| 2020/0106775 A1* | 4/2020 | Zeng | .................... | H04W 12/06 |
| 2020/0336305 A1* | 10/2020 | Li | ........................ | H04W 12/06 |

FOREIGN PATENT DOCUMENTS

| | | |
|---|---|---|
| CN | 106899607 A | 6/2017 |
| CN | 106911718 A | 6/2017 |
| CN | 107248915 A | 10/2017 |
| CN | 108199851 A | 6/2018 |
| CN | 108416206 A | 8/2018 |
| EP | 0903271 A2 | 3/1999 |
| JP | 2004248330 A | 9/2004 |

OTHER PUBLICATIONS

Ritu Patidar et al., Modified RSA Cryptosystem Based on Offline Storage and Prime Number, 2013 IEEE International Conference on Computational Intelligence and Computing Research, IEEE, dated Dec. 26, 2013, pp. 1-6.

M.R.K.Ariffin et al., "AA Public Key Cryptosystem—A Comparative Analysis Against RSA and ECC", Computing and Convergence Technology (ICCCT), 2012 7th International Conference on, IEEE, dated Dec. 3, 2012, pp. 589-594.

The First Office Action and search report dated Aug. 27, 2020 for Chinese Application no. 201811062076.1, 11 pages.

The extended European search report dated Mar. 23, 2021 for European Application No. 21154085.1, 10 pages.

* cited by examiner

METHOD FOR DATA TRANSMISSION, BATTERY MANAGEMENT SYSTEM, AND STORAGE MEDIUM

CROSS-REFERENCE TO RELATED APPLICATION

This application is based on and claims priority to Chinese Patent Application No. 201811062076.1 filed on Sep. 12, 2018, which is incorporated herein by reference in its entirety.

TECHNICAL FIELD

The present disclosure relates to the field of battery technology, and more particularly to a method for data transmission, battery management system, and storage medium.

BACKGROUND

In a battery management system, wireless communication technology may be used for data communication between a main control unit and a plurality of sampling units to complete command request and data uploading tasks. In order to realize the normal data communication between the main control unit and the sampling unit as well as the normal data communication between each of the plurality of sampling units, the node of the main control unit and the nodes of the plurality of sampling units may need to be encoded with physical serial number. After the encoding is completed, the nodes of the sampling units may report voltage data, temperature data, current data and diagnostic data of the battery periodically or based on events to the node of the main control unit via wireless signals, such that the main control unit may perform data processing and corresponding actions.

Although a wireless communication channel of a wireless communication network may be more flexible than that of a wired communication network, since the wireless communication channel is an open channel, it may reduce the security of data transmission between the nodes in the battery management system when giving the communication flexibility to the wireless node.

SUMMARY

Embodiments of the present disclosure provide a method for data transmission, battery management system, and storage medium.

In a first aspect, an embodiment of the present disclosure provides a method for data transmission, including: authenticating, by a target node in a battery management system, a source node in response to a request for data transmission from the source node; selecting, by the target node, any two prime numbers from a pre-stored set of prime numbers if the authentication is passed, generating a public key and a private key according to the two prime numbers, and transmitting the public key to the source node; performing, by the source node, a first encryption byte-by-byte for source data to be transmitted using the public key, performing a second encryption for the first encrypted data using a first encryption algorithm stored by the source node itself, and transmitting the second encrypted data to the target node; and performing, by the target node, a first decryption for the second encrypted data using a decryption algorithm corresponding to the first encryption algorithm and stored by the target node itself, and performing a second decryption byte-by-byte for the first decrypted data using the private key.

In a possible implementation of the first aspect, wherein authenticating, by the target node in the battery management system, the source node may include: determining whether a source node address in the request for data transmission is an address in a pre-set set of MAC addresses; generating, by the target node, an authentication seed via a random number generator if the source node address is the address in the pre-set set of MAC addresses, transmitting the authentication seed to the source node, and encrypting the authentication seed based on a second encryption algorithm stored by the target node itself to generate a first authentication key; encrypting, by the source node, the authentication seed based on the second encryption algorithm stored by the source node itself to generate a second authentication key, and transmitting the second authentication key to the target node; comparing, by the target node, the first authentication key and the second authentication key; confirming that the authentication is passed, if the first authentication key matches the second authentication key.

In a possible implementation of the first aspect, wherein encrypting, by the source node, the authentication seed based on the second encryption algorithm stored by the source node itself to generate the second authentication key may include: performing, by the source node, a check calculation on the received authentication seed based on a check algorithm stored by the source node itself to obtain a first check code; comparing the first check code and a second check code, wherein the second check code may be obtained by performing, by the target node, a check calculation on the authentication seed to be transmitted based on a check algorithm which is stored by the target node itself and consistent with the check algorithm of the source node; and encrypting, by the source node, the authentication seed based on the second encryption algorithm stored by the source node itself to generate the second authentication key, if the first check code matches the second check code.

In a possible implementation of the first aspect, wherein comparing, by the target node, the first authentication key and the second authentication key may include: performing, by the target node, a check calculation on the received second authentication key based on a check algorithm stored by the target node itself to obtain a third check code; comparing the third check code and a fourth check code, wherein the fourth check code may be obtained by performing, by the source node, a check calculation on the second authentication key to be transmitted based on a check algorithm which is stored by the source node itself and consistent with the check algorithm of the target node; and comparing, by the target node, the first authentication key and the second authentication key if the third check code matches the fourth check code.

In a possible implementation of the first aspect, wherein after authenticating, by the target node in the battery management system, the source node, the method may further include: re-authenticating, by the target node, the source node when there is a new data transmission request between the target node and the source node, if there is no data transmission between the target node and the source node within a predetermined time period after the authentication is passed.

In a possible implementation of the first aspect, wherein generating the public key and the private key according to the two prime numbers may include: obtaining two natural numbers m and n according to the two prime numbers, wherein m is a product of the two prime numbers, and n is a product of two numbers obtained by subtracting 1 from the two prime numbers respectively; selecting a natural number e which is mutually prime with m from natural numbers between 0 and m, and obtaining d from e and m, wherein a pair of numbers including e and n is used as the public key, and a pair of numbers including d and n is used as the private key, and a result of a first difference value mod m is equal to 0, the first difference value being a value obtained by subtracting 1 from a product of d and e.

In a possible implementation of the first aspect, wherein performing, by the source node, a first encryption byte-by-byte for source data to be transmitted using the public key may include: obtaining a first encryption result of the source data to be transmitted by calculating a e-th power of the source data to be transmitted byte-by-byte and calculating a result of an e-th power of each byte mod n respectively.

In a possible implementation of the first aspect, wherein performing a second decryption byte-by-byte for the first decrypted data using the private key may include: obtaining a second decryption result of the first decrypted data by calculating a d-th power of the first decrypted data byte-by-byte and calculating a result of a d-th power of each byte mod n respectively.

In a possible implementation of the first aspect, wherein performing, by the source node, a first encryption byte-by-byte for source data to be transmitted using the public key may include: performing, by the source node, a check calculation on the received public key based on a check algorithm stored by the source node itself to obtain a fifth check code; comparing the fifth check code and a sixth check code, wherein the sixth check code may be obtained by performing, by the target node, a check calculation on the public key to be transmitted based on a check algorithm which is stored by the target node itself and consistent with the check algorithm of the source node; and performing, by the source node, the first encryption byte-by-byte for the source data to be transmitted using the public key, if the fifth check code matches the sixth check code.

In a possible implementation of the first aspect, wherein after performing the second decryption byte-by-byte for the first decrypted data using the private key, the method further may include: performing, by the target node, a check calculation on the second decrypted data based on a second check algorithm stored by the target node itself to obtain a seventh check code; comparing the seventh check code and a eighth check code, wherein the eighth check code may be obtained by performing, by the source node, a check calculation on the source data to be transmitted based on a check algorithm which is stored by the source node itself and consistent with the second check algorithm of the target node; and determining that the second decrypted data is consistent with the source data to be transmitted if the seventh check code matches the eighth check code.

In a second aspect, an embodiment of the present disclosure provides a battery management system, comprising: a target node, configured to authenticate a source node in response to a request for data transmission from the source node, select any two prime numbers from a pre-stored set of prime numbers if the authentication is passed, generate a public key and a private key according to the two prime numbers, and transmit the public key to the source node; the source node, configured to perform a first encryption byte-by-byte for source data to be transmitted using the public key, perform a second encryption for the first encrypted data using a first encryption algorithm stored by the source node itself, and transmit the second encrypted data to the target node; wherein the target node may be further configured to perform a first decryption for the second encrypted data using a decryption algorithm corresponding to the first encryption algorithm and stored by the target node itself, and perform a second decryption byte-by-byte for the first decrypted data using the private key.

In a third aspect, an embodiment of the present disclosure provides a computer readable storage medium having a program stored thereon, the program, when executed by a processor, causing the processor to implement the method for data transmission described above.

BRIEF DESCRIPTION OF THE DRAWINGS

The present disclosure will be better understood from the following detailed description of non-limiting embodiments of the present disclosure with reference to the drawings in which like or similar reference numerals indicate like or similar features.

DETAILED DESCRIPTION

The features and exemplary embodiments of various aspects of the present disclosure will be described in detail below. In the following detailed description, numerous specific details are set forth in order to provide a thorough understanding of the present disclosure.

Embodiments of the present disclosure provide a method for data transmission, battery management system, and storage medium, which may be used in the field of battery data. With the technical solution of the embodiments of the present disclosure, the security of data transmission between nodes in the battery management system may be improved.

There may be several or dozens of sampling units in the battery management system, and the number may vary according to the application. Wireless data transmission may be performed between nodes of the sampling units as well as between a node of a main control unit and the nodes of the sampling units. In the embodiments of the present disclosure, a node of a data transmitter may be referred to as a source node, and a node of a data receiver may be referred to as a target node.

Source data to be transmitted may include sample data related to a battery, such as voltage data, temperature data, current data, and diagnostic data, and/or control data related to the battery, such as equalization instructions.

Figure 1:
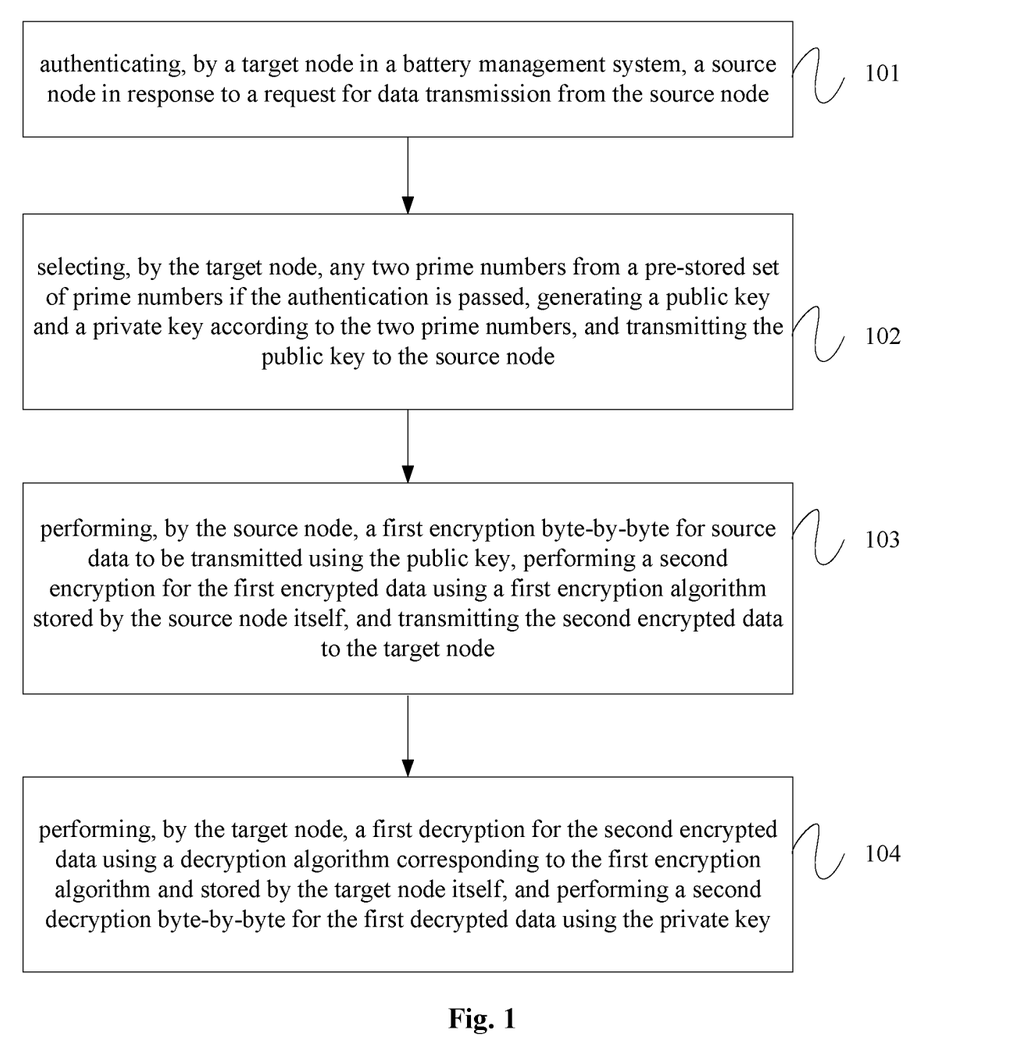
FIG. 1 is a schematic flow diagram of a method for data transmission according to an embodiment of the present disclosure.

FIG. 1 is a schematic flow diagram of a method for data transmission according to an embodiment of the present disclosure. As shown in FIG. 1, the method for data transmission may include steps 101-104 to describe the interaction process of wireless data transmission between a source node and a target node.

In step 101, a target node in a battery management system may authenticate a source node in response to a request for data transmission from the source node.

Considering that a node outside the system may impersonate a node in the system to perform actions of sampling, equalization, fault handling and diagnosis, which may result in uncontrolled equalization, uncontrolled thermal management, or distortion of an uploaded voltage and current temperature, such that there is a great potential safety hazard. Therefore, when performing data transmission, the source node should be authenticated first, thereby avoiding the above-mentioned potential safety hazard and maintaining the safe operation of the system. In the embodiments of the present disclosure, unless otherwise specified, the system generally refers to the battery management system.

In step 102, the target node may select any two prime numbers from a pre-stored set of prime numbers if the authentication is passed, generate a public key and a private key according to the two prime numbers, and transmit the public key to the source node.

In step 103, the source node may perform a first encryption byte-by-byte for source data to be transmitted using the public key, perform a second encryption for the first encrypted data using a first encryption algorithm stored by the source node itself, and transmit the second encrypted data to the target node.

In step 104, the target node may perform a first decryption for the second encrypted data using a decryption algorithm corresponding to the first encryption algorithm and stored by the target node itself, and perform a second decryption byte-by-byte for the first decrypted data using the private key.

Generally, the system may perform encryption operations on the transmitted and received data to prevent a node outside the system from stealing data in the channel between the nodes in the system. Commonly used encryption algorithms may include an AES encryption algorithm. However, in the case where the encryption algorithm is relatively simple, the node outside the system may still obtain detailed data signals easily, and further analyze data content, so that the node data may still have a possibility of being stolen.

Therefore, on the one hand, the embodiments of the present invention provide a redundant encryption design on the basis of AES encryption and decryption, that is, data may need to be encrypted twice when performing wireless data transmission between the nodes in the system, thereby improving the security of wireless data transmission.

On the other hand, the embodiments of the present invention adopt an encryption algorithm based on a public key and a private key. Since the public key and the private key are generated based on any two prime numbers in a set of prime numbers, the public key and the private key are random. Even if a node outside the system acquires the public key, it will not affect the security of the next wireless data transmission.

The process of generating the public key and the private key by the target node is described in detail below.

Wherein, the target node should pre-store a certain number of prime numbers.

In an example, in order to increase the difficulty of encryption and decryption, the number of prime numbers stored in the target node should be greater than 16.

S1, the target node may select two prime numbers a and b from the pre-stored prime numbers.

S2, two natural numbers m and n may be obtained according to the two prime numbers, wherein m is a product of the two prime numbers, that is, m=a×b, and n is a product of two numbers obtained by subtracting 1 from the two prime numbers respectively, that is, n=(a−1)×(b−1);

S3, a natural number e may be selected which is mutually prime with m from natural numbers between 0 and m, wherein a pair of numbers (e, n) including e and n may be the public key.

S4, based on the known natural numbers e and m, the natural number d may be derived according to the expression (e×d−1)MOD m=0, wherein MOD represents calculating residue, and a pair of numbers (d, n) including d and n may be the private key.

In combination with steps S1-S4, it may be obtained that, in step 103, performing, by the source node, a first encryption byte-by-byte for source data to be transmitted using the public key may include: obtaining a first encryption result of the source data to be transmitted by calculating a e-th power of the source data to be transmitted byte-by-byte and calculating a result of an e-th power of each byte mod n respectively.

Specifically, a ciphertext may be obtained by performing the first encryption byte-by-byte for source data to be transmitted according to the following formula:

$$y = x^e \text{ MOD } n \quad (1)$$

Wherein, MOD represents calculating residue, x is a single-byte data to be encrypted, and y is an encrypted single-byte data.

Similarly, in combination with steps S1-S4, it may be obtained that, in step 104, performing a second decryption byte-by-byte for the first decrypted data using the private key may include: obtaining a second decryption result of the first decrypted data by calculating a d-th power of the first decrypted data byte-by-byte and calculating a result of a d-th power of each byte mod n respectively.

Specifically, a plaintext may be obtained by performing the second decryption byte-by-byte for the first decrypted data according to the following formula:

$$x = y^d \text{ MOD } n \quad (2)$$

Wherein, MOD represents calculating residue, x is a decrypted single-byte data, and y is a single-byte data to be decrypted.

Figure 2:
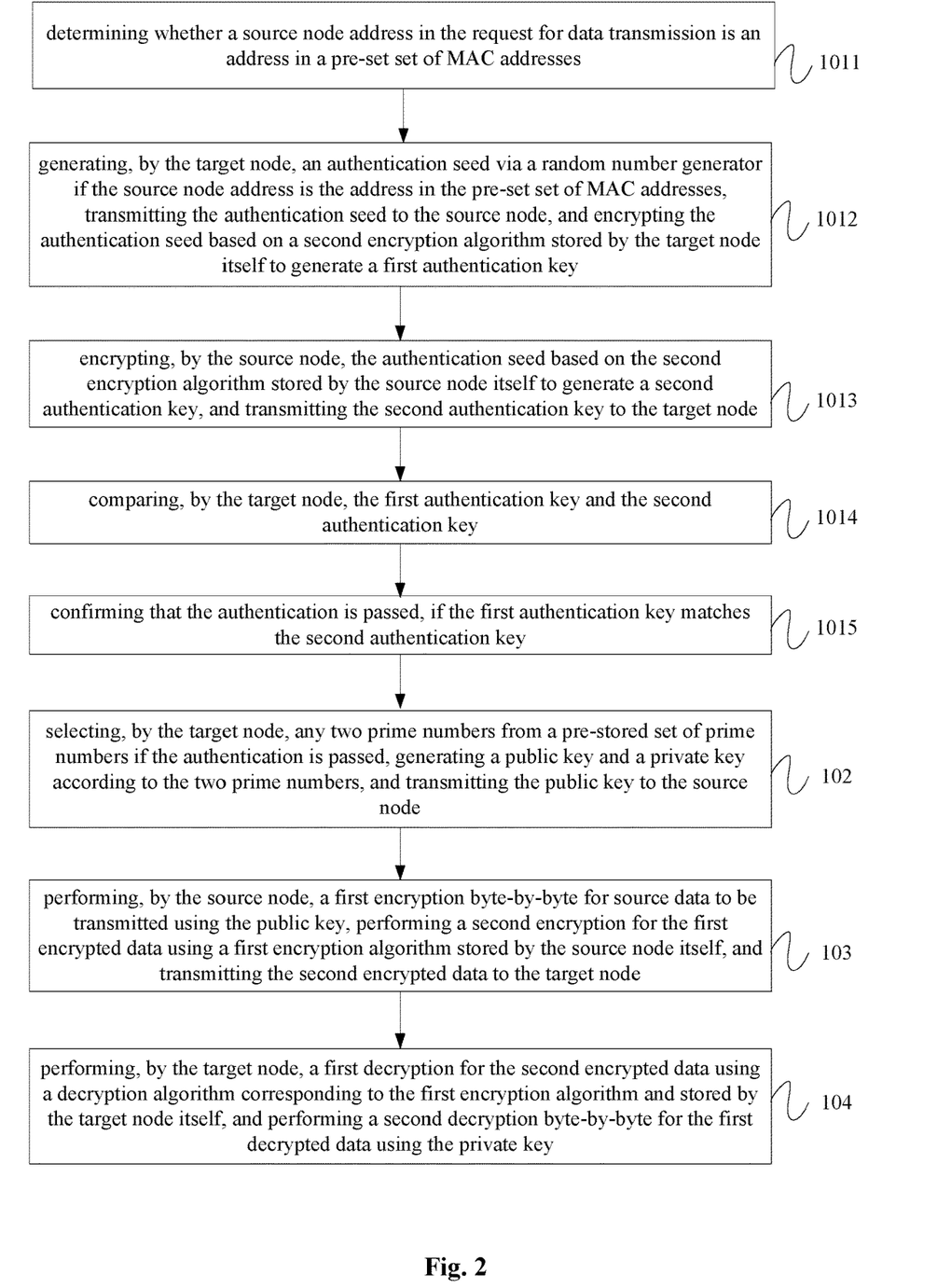
FIG. 2 is a schematic flow diagram of a method for data transmission according to an embodiment of the present disclosure.

FIG. 2 is a schematic flow diagram of a method for data transmission according to an embodiment of the present disclosure. The difference between FIG. 2 and FIG. 1 is that, step 101 in FIG. 1 may be refined into steps 1011-1015 in FIG. 2 for detailed description of the process of the target node authenticating the source node.

In step 1011, whether a source node address in the request for data transmission is an address in a pre-set set of MAC addresses may be determined.

Each node in the system may have a unique MAC address of 8-byte. In system networking coding, all nodes in the system may receive and store the MAC addresses of all nodes in the system. In communication process, if a MAC address received by the target node is not the MAC address in the system, the received data may be discarded. Otherwise, the data may be analyzed.

In step 1012, the target node may generate an authentication seed via a random number generator if the source node address is the address in the pre-set of MAC addresses, transmit the authentication seed to the source node, and encrypt the authentication seed based on a second encryption algorithm stored by the target node itself to generate a first authentication key.

In this step, a random generator program and an authentication key algorithm may be added to the software to which the target node belongs, and the authentication key algorithm may be unique in the system.

In step 1013, the source node may encrypt the authentication seed based on the second encryption algorithm stored by the source node itself to generate a second authentication key, and transmit the second authentication key to the target node.

In step 1014, the target node may compare the first authentication key and the second authentication key.

In step 1015, the authentication may be passed, if the first authentication key matches the second authentication key.

In an alternative embodiment, the target node may re-authenticate the source node when there is a new data transmission request between the target node and the source node, if there is no data transmission between the target node and the source node within a predetermined time period after the authentication is passed.

That is to say, after each successful connection, the source node may receive the authentication flag provided by the target node. If the specified time is not exceeded, further authentication may not be required, and subsequent communication may be performed. Otherwise, the key authentication should be performed again to further improve the security of data transmission between nodes in the system.

The above mainly discusses the improvement of the security of data transmission between the nodes in the system from the aspects of node authentication and data encryption and decryption. Considering that wireless data transmission between the nodes may have data tampering, for example, the data may not be transmitted completely due to a failure of the transmitter; there is a mask signal generated; or a node outside the system may receive the signal, and then the signal may be tampered and forwarded to the receiver. Therefore, the embodiments of the present disclosure may also have a data integrity check.

Since the wireless data transmission between the nodes in the system includes an authentication part and an encryption and decryption part, and each part involves data interaction, the embodiments of the present disclosure may therefore describe the process of data integrity check from four aspects.

In the first aspect, the integrity of the public key received by the source node in step 103 may be determined.

Figure 3:
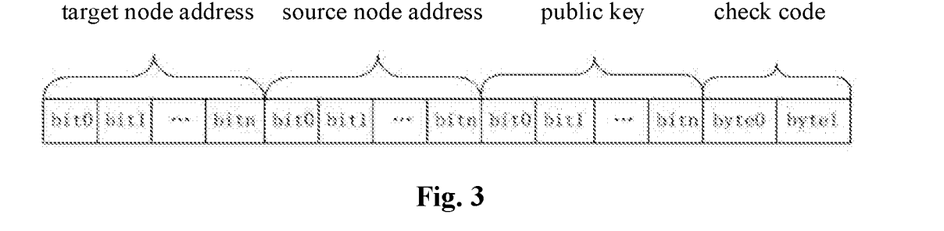
FIG. 3 is a schematic structural diagram of a data packet for encryption/decryption and check transmitted by a target node according to an embodiment of the present disclosure.

FIG. 3 is a schematic structural diagram of a data packet for encryption/decryption and check transmitted by a target node according to an embodiment of the present disclosure. The data packet shown in FIG. 3 may include, in an order from left to right, a target node address, a source node address, a public key, and a check code. Here, a check code obtained by the target node performing a check calculation on the public key to be transmitted based on a check algorithm stored by the target node itself may be recorded as C2.

Specifically, a check code C1 may be obtained by the source node performing a check calculation on the received public key based on a check algorithm which is stored by the source node itself and consistent with the check algorithm of the target node. C1 and C2 may then be compared. If C1 matches C2, the public key received by the source node may be integrity and the source node may perform the first encryption byte-by-byte for the source data to be transmitted using the public key.

In the second aspect, whether the data obtained by performing a second decryption byte-by-byte for the first decrypted data using the private key in step 104 is consistent with the source data to be transmitted may be determined.

Figure 4:
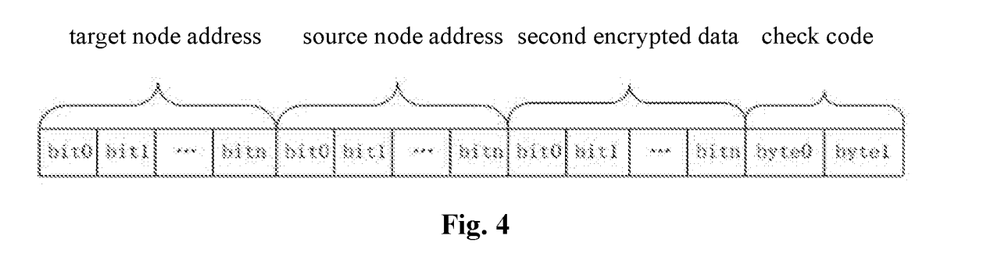
FIG. 4 is a schematic structural diagram of a data packet for encryption/decryption and check transmitted by a source node according to an embodiment of the present disclosure.

FIG. 4 is a schematic structural diagram of a data packet for encryption/decryption and check transmitted by a source node according to an embodiment of the present disclosure. The data packet shown in FIG. 4 may include, in an order from left to right, a target node address, a source node address, a second encrypted data, and a check code. Here, a check code obtained by the source node performing a check calculation on the source data to be transmitted based on a check algorithm stored by the source node itself may be recorded as C4.

Specifically, a check code C3 may be obtained by the target node performing a check calculation on the second decrypted data based on a check algorithm which is stored by the target node itself and consistent with the check algorithm of the source node. C3 and C4 may then be compared. If C3 matches C4, the second decrypted data may be consistent with the source data to be transmitted.

In the third aspect, the integrity of the authentication seed received by the source node in step 1013 may be determined.

Figure 5:
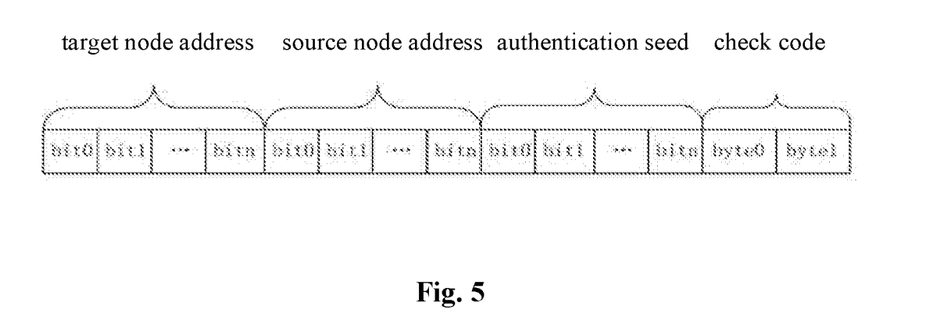
FIG. 5 is a schematic structural diagram of a data packet for authentication and check according to an embodiment of the present disclosure.

FIG. 5 is a schematic structural diagram of a data packet for authentication and check according to an embodiment of the present disclosure. The data packet shown in FIG. 5 may include, in an order from left to right, a target node address, a source node address, a authentication seed, and a check code. Here, a check code obtained by the target node performing a check calculation on the authentication seed to be transmitted based on a check algorithm stored by the target node itself may be recorded as C6.

Specifically, a check code C5 may be obtained by the source node performing a check calculation on the received random data seed based on a check algorithm which is stored by the source node itself and consistent with the check algorithm of the target node. C5 and C6 may then be compared. If C5 matches C6, the authentication seed received by the source node may be integrity and the source node may encrypt the authentication seed based on the second encryption algorithm stored by the source node itself to generate the second authentication key.

Figure 6:
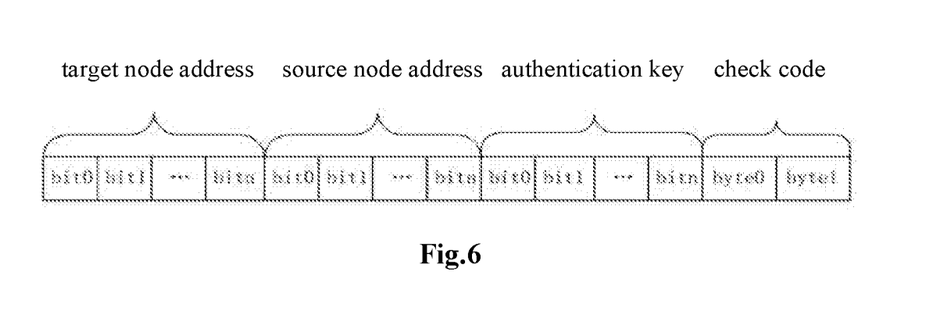
FIG. 6 is a schematic structural diagram of a data packet for authentication and check according to an embodiment of the present disclosure.

FIG. 6 is a schematic structural diagram of a data packet for authentication and check according to an embodiment of the present disclosure. The data packet shown in FIG. 6 may include, in an order from left to right, a target node address, a source node address, a authentication key, and a check code. Here, a check code obtained by the source node performing a check calculation on the second authentication key to be transmitted based on a check algorithm stored by the source node itself may be recorded as C8.

Specifically, a check code C7 may be obtained by the target node performing a check calculation on the received second authentication key based on a check algorithm which is stored by the target node itself and consistent with the check algorithm of the source node. C7 and C8 may then be compared. If C7 matches C8, the authentication key received by the target node may be integrity and the target node may compare the first authentication key and the second authentication key.

In an example, the check algorithm may be an MD5 check algorithm, and those skilled in the art may refer to related materials to learn the specific content of the algorithm.

Figure 7:
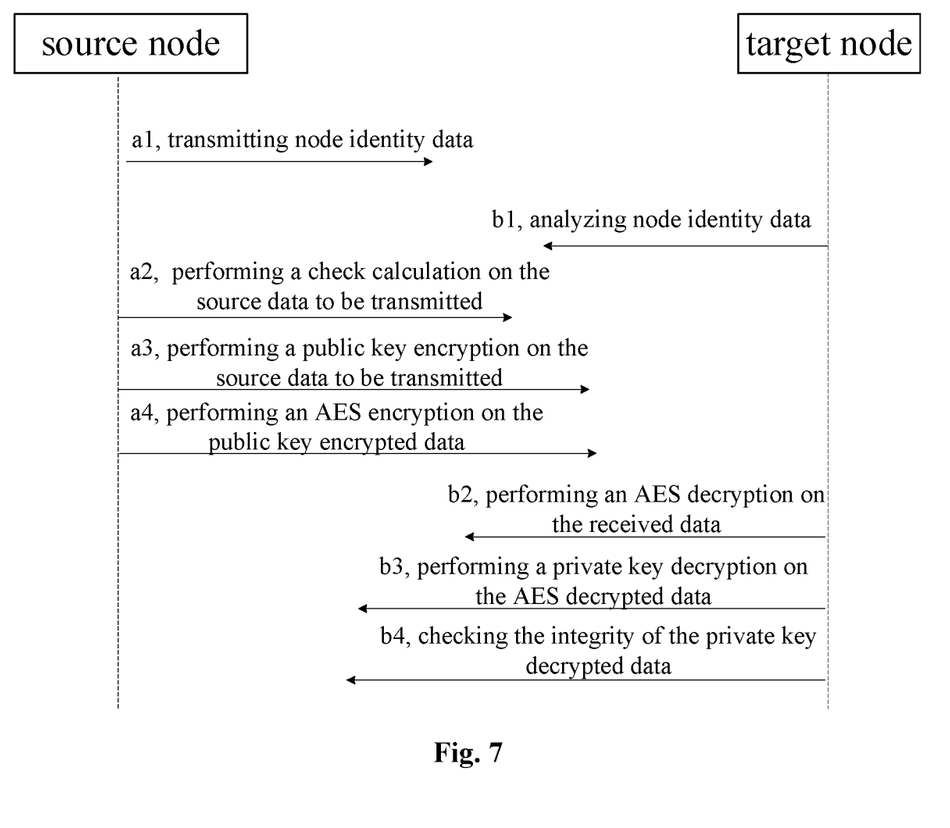
FIG. 7 is a schematic diagram of data interaction between a target node and a source node according to an embodiment of the present disclosure.

FIG. 7 is a schematic diagram of data interaction between a target node and a source node according to an embodiment of the present disclosure. FIG. 7 may be used to describe a data transmission model of node authentication, data integrity check and double encryption algorithms. The steps performed by the source node may be denoted by a, and the steps performed by the target node may be denoted by b.

First, the target node may authenticate the source node:
a1, node identity data may be transmitted;
b1, the node identity data may be analyzed;
Then, the source node may perform check calculation and encryption operations on the source data to be transmitted:
a2, a check calculation may be performed on the source data to be transmitted;
a3, a public key encryption may be performed on the source data to be transmitted;
a4, an AES encryption may be performed on the public key encrypted data;
Finally, the target node may perform decryption operations and integrity check on the received data:
b2, an AES decryption may be performed on the received data;
b3, a private key decryption may be performed on the AES decrypted data;
b4, the integrity of the private key decrypted data may be checked.

As discussed above, when wireless data transmission is performed between the nodes in the system, the method combined of node authentication, data integrity check, and double encryption algorithms may be used to significantly improve the security of wireless communication of the battery management system.

The embodiments of the present disclosure further provide a battery management system, including a target node and a source node.

Wherein, the target node may be configured to authenticate the source node in response to a request for data transmission from the source node, select any two prime numbers from a pre-stored set of prime numbers if the authentication is passed, generate a public key and a private key according to the two prime numbers, and transmit the public key to the source node.

The source node may be configured to perform a first encryption byte-by-byte for source data to be transmitted using the public key, perform a second encryption for the first encrypted data using a first encryption algorithm stored by the source node itself, and transmit the second encrypted data to the target node.

Wherein, the target node may be further configured to perform a first decryption for the second encrypted data using a decryption algorithm corresponding to the first encryption algorithm and stored by the target node itself, and perform a second decryption byte-by-byte for the first decrypted data using the private key.

The embodiments of the present disclosure further provide a computer readable storage medium having a program stored thereon, the program, when executed by a processor, causing the processor to implement the method for data transmission described above.

It should be clear that the embodiments in this specification are described in a progressive manner, and the same or similar parts in each embodiment may be referred to each other, and each embodiment focuses on the difference from other embodiments. For device embodiments, relevant parts can be referred to the description of the method embodiments. The embodiments of the present disclosure are not limited to the specific steps and structures described above and shown in the drawings. Those skilled in the art can make various changes, modifications and additions or changing the order between steps after understanding the spirit of the embodiments of the present disclosure. Also, for the sake of brevity, detailed descriptions of known methods and techniques are omitted here.

The functional blocks shown in the block diagrams described above may be implemented as hardware, software, firmware, or a combination thereof. When implemented in hardware, it may be, for example, an electronic circuit, an application specific integrated circuit (ASIC), suitable firmware, plug-ins, function cards, and the like. When implemented in software, the elements of an embodiment of the present disclosure are programs or code segments that are used to perform the required tasks. Programs or code segments may be stored on a machine-readable medium or transmitted over a transmission medium or communication link via a data signal carried in a carrier wave. The "machine-readable medium" may include any medium that is capable of storing or transmitting information. Examples of machine-readable media include electronic circuitry, semiconductor memory devices, ROMs, flash memory, erasable ROM (EROM), floppy disks, CD-ROMs, optical disks, hard disks, fiber optic media, radio frequency (RF) links, and the like. The code segments may be downloaded via a computer network such as the Internet, an intranet or the like.

The embodiments of the present disclosure may be implemented in other specific forms without departing from its spirit and essential characteristics. For example, the algorithms described in the specific embodiments may be modified without system architecture departing from the basic spirit of the embodiments of the present disclosure. As such, the embodiments are to be considered in all respects as illustrative and not restrictive, and the scope of the embodiments of the disclosure is defined by the appended claims rather than the foregoing descriptions. All changes that are defined in the meaning and the equivalents of the claims come within the scope of the embodiments of the disclosure.

What is claimed is:
1. A method for data transmission, comprising:
authenticating, by a target node in a battery management system, a source node in response to a request for data transmission from the source node;
selecting, by the target node, any two prime numbers from a pre-stored set of prime numbers if the authentication is passed, generating a public key and a private key according to the two prime numbers, and transmitting the public key to the source node;
performing, by the source node, a first encryption byte-by-byte for source data to be transmitted using the public key, performing a second encryption for the first encrypted data using a first encryption algorithm stored by the source node itself, and transmitting the second encrypted data to the target node; and
performing, by the target node, a first decryption for the second encrypted data using a decryption algorithm corresponding to the first encryption algorithm and stored by the target node itself, and performing a second decryption byte-by-byte for the first decrypted data using the private key, and
wherein authenticating, by the target node in the battery management system, the source node comprises:
determining whether a source node address in the request for data transmission is an address in a pre-set set of MAC addresses;

generating, by the target node, an authentication seed via a random number generator if the source node address is the address in the pre-set set of MAC addresses, transmitting the authentication seed to the source node, and encrypting the authentication seed based on a second encryption algorithm stored by the target node itself to generate a first authentication key;

encrypting, by the source node, the authentication seed based on the second encryption algorithm stored by the source node itself to generate a second authentication key, and transmitting the second authentication key to the target node;

comparing, by the target node, the first authentication key and the second authentication key; and confirming that the authentication is passed, if the first authentication key matches the second authentication key.

2. The method according to claim 1, wherein encrypting, by the source node, the authentication seed based on the second encryption algorithm stored by the source node itself to generate the second authentication key comprises:

performing, by the source node, a check calculation on the received authentication seed based on a check algorithm stored by the source node itself to obtain a first check code;

performing, by the target node, a check calculation on the authentication seed to be transmitted based on a check algorithm which is stored by the target node itself and consistent with the check algorithm of the source node, so as to obtain a second check code;

comparing the first check code and the second check code; and encrypting, by the source node, the authentication seed based on the second encryption algorithm stored by the source node itself to generate the second authentication key, if the first check code matches the second check code.

3. The method according to claim 1, wherein comparing, by the target node, the first authentication key and the second authentication key comprises:

performing, by the target node, a check calculation on the received second authentication key based on a check algorithm stored by the target node itself to obtain a first check code;

performing, by the source node, a check calculation on the second authentication key to be transmitted based on a check algorithm which is stored by the source node itself and consistent with the check algorithm of the target node, so as to obtain a second check code;

comparing the first check code and the second check code; and comparing, by the target node, the first authentication key and the second authentication key if the first check code matches the second check code.

4. The method according to claim 1, wherein after authenticating, by the target node in the battery management system, the source node, the method further comprises:

re-authenticating, by the target node, the source node when there is a new data transmission request between the target node and the source node, if there is no data transmission between the target node and the source node within a predetermined time period after the authentication is passed.

5. The method according to claim 1, wherein after authenticating, by the target node in the battery management system, the source node, the method further comprises:

re-authenticating, by the target node, the source node when there is a new data transmission request between the target node and the source node, if there is no data transmission between the target node and the source node within a predetermined time period after the authentication is passed.

6. The method according to claim 1, wherein generating the public key and the private key according to the two prime numbers comprises:

obtaining two natural numbers m and n according to the two prime numbers, wherein m is a product of the two prime numbers, and n is a product of two numbers obtained by subtracting 1 from the two prime numbers respectively; and selecting a natural number e which is mutually prime with m from natural numbers between 0 and m, and obtaining d from e and m, wherein a pair of numbers including e and n is used as the public key, and a pair of numbers including d and n is used as the private key, and a result of a first difference value mod m is equal to 0, the first difference value being a value obtained by subtracting 1 from a product of d and e.

7. The method according to claim 1, wherein generating the public key and the private key according to the two prime numbers comprises:

obtaining two natural numbers m and n according to the two prime numbers, wherein m is a product of the two prime numbers, and n is a product of two numbers obtained by subtracting 1 from the two prime numbers respectively; and selecting a natural number e which is mutually prime with m from natural numbers between 0 and m, and obtaining d from e and m, wherein a pair of numbers including e and n is used as the public key, and a pair of numbers including d and n is used as the private key, and a result of a first difference value mod m is equal to 0, the first difference value being a value obtained by subtracting 1 from a product of d and e.

8. The method according to claim 6, wherein performing, by the source node, a first encryption byte-by-byte for source data to be transmitted using the public key comprises:

obtaining a first encryption result of the source data to be transmitted by calculating a e-th power of the source data to be transmitted byte-by-byte and calculating a result of an e-th power of each byte mod n respectively.

9. The method according to claim 6, wherein performing a second decryption byte-by-byte for the first decrypted data using the private key comprises:

obtaining a second decryption result of the first decrypted data by calculating a d-th power of the first decrypted data byte-by-byte and calculating a result of a d-th power of each byte mod n respectively.

10. The method according to claim 1, wherein performing, by the source node, a first encryption byte-by-byte for source data to be transmitted using the public key comprises:

performing, by the source node, a check calculation on the received public key based on a check algorithm stored by the source node itself to obtain a first check code;

comparing the first check code and a second check code, wherein the second check code is obtained by performing, by the target node, a check calculation on the public key to be transmitted based on a check algorithm which is stored by the target node itself and consistent with the check algorithm of the source node; and performing, by the source node, the first encryption byte-by-byte for the source data to be transmitted using the public key, if the first check code matches the second check code.

11. The method according to claim 6, wherein performing, by the source node, a first encryption byte-by-byte for source data to be transmitted using the public key comprises:
performing, by the source node, a check calculation on the received public key based on a check algorithm stored by the source node itself to obtain a first check code;
comparing the first check code and a second check code, wherein the second check code is obtained by performing, by the target node, a check calculation on the public key to be transmitted based on a check algorithm which is stored by the target node itself and consistent with the check algorithm of the source node; and
performing, by the source node, the first encryption byte-by-byte for the source data to be transmitted using the public key, if the first check code matches the second check code.

12. The method according to claim 1, wherein after performing the second decryption byte-by-byte for the first decrypted data using the private key, the method further comprises:
performing, by the target node, a check calculation on the second decrypted data based on a second check algorithm stored by the target node itself to obtain a first check code;
comparing the first check code and a second check code, wherein the second check code is obtained by performing, by the source node, a check calculation on the source data to be transmitted based on a check algorithm which is stored by the source node itself and consistent with the second check algorithm of the target node; and
determining that the second decrypted data is consistent with the source data to be transmitted if the first check code matches the second check code.

13. The method according to claim 6, wherein after performing the second decryption byte-by-byte for the first decrypted data using the private key, the method further comprises:
performing, by the target node, a check calculation on the second decrypted data based on a second check algorithm stored by the target node itself to obtain a first check code;
comparing the first check code and a second check code, wherein the second check code is obtained by performing, by the source node, a check calculation on the source data to be transmitted based on a check algorithm which is stored by the source node itself and consistent with the second check algorithm of the target node; and
determining that the second decrypted data is consistent with the source data to be transmitted if the first check code matches the second check code.

14. A battery management system, comprising:
a target node, configured to authenticate a source node in response to a request for data transmission from the source node, select any two prime numbers from a pre-stored set of prime numbers if the authentication is passed, generate a public key and a private key according to the two prime numbers, and transmit the public key to the source node;
the source node, configured to perform a first encryption byte-by-byte for data to be transmitted using the public key, perform a second encryption for the first encrypted data using a first encryption algorithm stored by the source node itself, and transmit the second encrypted data to the target node;
wherein the target node is further configured to perform a first decryption for the second encrypted data using a decryption algorithm corresponding to the first encryption algorithm and stored by the target node itself, and perform a second decryption byte-by-byte for the first decrypted data using the private key, and
wherein the target node is further configured to:
determine whether a source node address in the request for data transmission is an address in a pre-set set of MAC addresses; and
generate an authentication seed via a random number generator if the source node address is the address in the pre-set set of MAC addresses, transmit the authentication seed to the source node, and encrypt the authentication seed based on a second encryption algorithm stored by the target node itself to generate a first authentication key;
wherein the source node is further configured to:
encrypt the authentication seed based on the second encryption algorithm stored by the source node itself to generate a second authentication key, and transmit the second authentication key to the target node;
wherein the target node is further configured to:
compare the first authentication key and the second authentication key; and
confirm that the authentication is passed, if the first authentication key matches the second authentication key.

15. The battery management system according to claim 14,
wherein the source node is further configured to:
perform a check calculation on the received authentication seed based on a check algorithm stored by the source node itself to obtain a first check code;
wherein the target node is further configured to:
perform a check calculation on the authentication seed to be transmitted based on a check algorithm which is stored by the target node itself and consistent with the check algorithm of the source node, so as to obtain a second check code;
wherein the source node is further configured to:
compare the first check code and the second check code; and
encrypt the authentication seed based on the second encryption algorithm stored by the source node itself to generate the second authentication key, if the first check code matches the second check code.

16. The battery management system according to claim 14,
wherein the target node is further configured to:
perform a check calculation on the received second authentication key based on a check algorithm stored by the target node itself to obtain a first check code;
wherein the source node is further configured to:
perform a check calculation on the second authentication key to be transmitted based on a check algorithm which is stored by the source node itself and consistent with the check algorithm of the target node, so as to obtain a second check code;
wherein the target node is further configured to:
compare the first check code and the second check code; and compare the first authentication key and the second authentication key if the third first check code matches the second check code.

17. The battery management system according to claim 14, wherein the target node is further configured to:
obtain two natural numbers m and n according to the two prime numbers, wherein m is a product of the two prime numbers, and n is a product of two numbers obtained by subtracting 1 from the two prime numbers respectively; and
select a natural number e which is mutually prime with m from natural numbers between 0 and m, and obtaining d from e and m, wherein a pair of numbers including e and n is used as the public key, and a pair of numbers including d and n is used as the private key, and a result of a first difference value mod m is equal to 0, the first difference value being a value obtained by subtracting 1 from a product of d and e.

18. A non-transitory computer readable storage medium having a program stored thereon, the program, when executed by a processor, causing the processor to implement the method for data transmission according to claim 1.

* * * * *